United States Patent Office 3,429,249
Patented Feb. 25, 1969

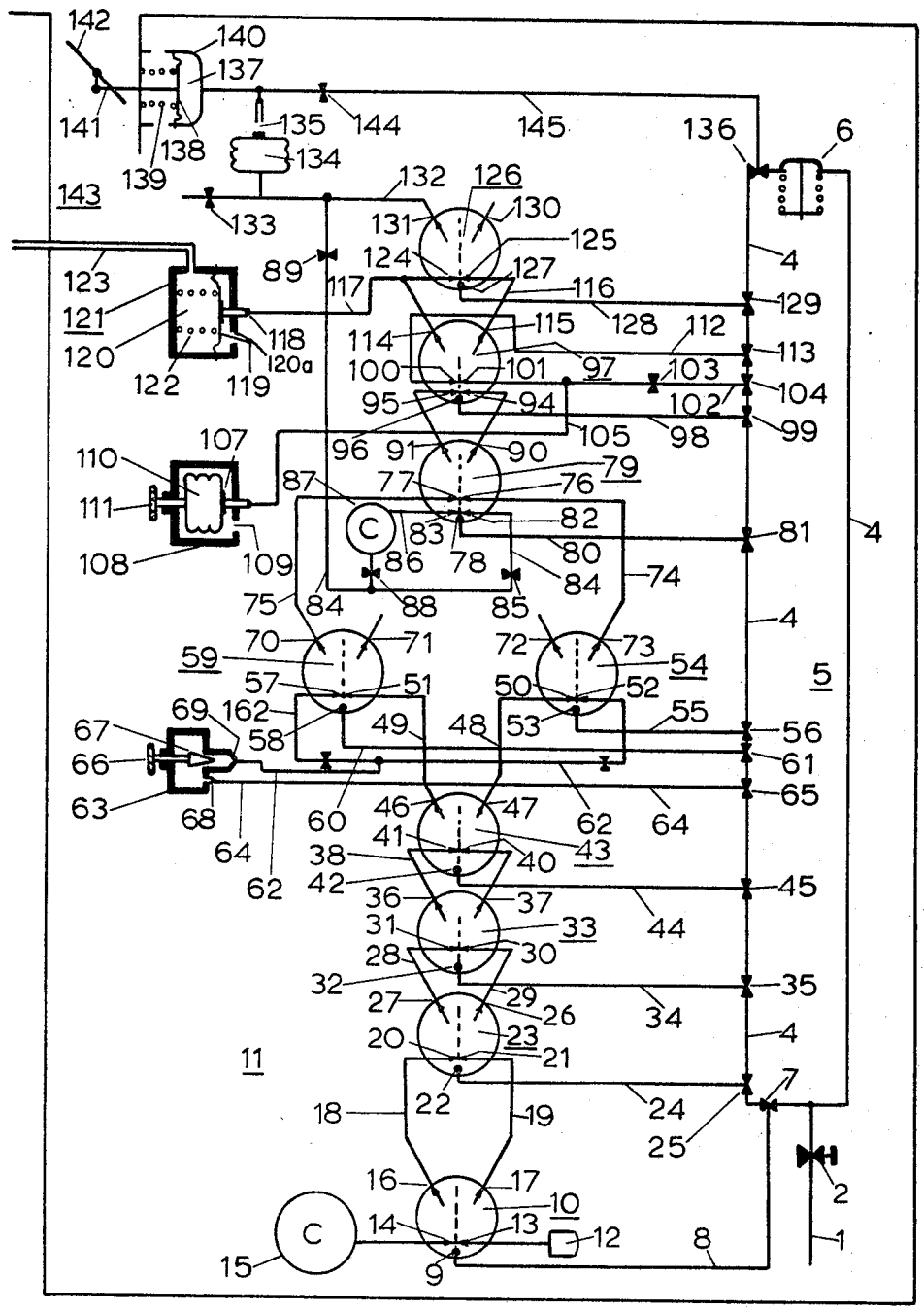

3,429,249
PRESSURISATION OF ENCLOSED CHAMBERS
UTILISING FLUID LOGIC DEVICES
Owen Desmond Furlong, East Coker, Somerset, England, assignor to Westland Aircraft Limited, Yeovil, Somerset, England
Filed Nov. 21, 1966, Ser. No. 595,881
Claims priority, application Great Britain, Jan. 18, 1966, 2,386/66
U.S. Cl. 98—1.5                                             6 Claims
Int. Cl. B64d *13/04;* F15c *1/08, 1/14*

ABSTRACT OF THE DISCLOSURE

An arrangement employing fluid amplifier devices for controlling the rate of change of pressure in an enclosed chamber such as an aircraft cabin. The sensed rate of change controls the pressure of one control nozzle and a predetermined bias pressure controls a second control nozzle in opposition to the first control nozzle. The sensed signal must overcome the predetermined bias signal before it can effect a change in the pressure in the cabin.

---

This invention relates to a pressure control system actuated by fluid operated logic components, developed mainly, but not exclusively, for use in pressurised aircraft.

Pressure control systems, for example, in aircraft, have reached a stage where they are costly, both to produce and to maintain. Such systems employ numerous moving parts, and rely upon the duplication of components to cover any system failure. A major fault in components having moving parts is the high failure rate caused mainly by friction and wear, the inertia or weight of the moving parts, and complex problems of thermal expansion.

The object of the invention is to utilize a system of fluid logic elements and fluid devices, to control the rate of change of pressure in an enclosed chamber, and apply the effect of said control to assist the operation of a fluid logic pressurisation control system.

As is well understood, logic elements, such as those employed in the invention, can be used in systems based on Boolean algebra and cater for relationships expressed by "and," "or," "not," or "either." One such element includes a power nozzle that supplies air continuously to be received selectively by two apertures, according to the action of lateral control jets arranged to cause the jet from the power nozzle to deviate towards one or other of the apertures, or to remain centrally between them. However, in the present invention, the logic elements are not necessarily used in a rigorous system of symbolic logic.

According to the invention we provide a fluid operated pressurisation control system for an enclosed chamber, wherein said control system includes one or more fluid logic elements for sensing the rate of change of pressure within said chamber, and valve means for controlling said rate of change, said valve means being preset to limit this rate of change to within an acceptable range, by opposing the rate signal developed by said fluid logic elements in an associated fluid element with a regulated bias pressure which has to be overcome before the rate signal, amplified as required, becomes operative through the remainder of said system, actuating means to control the inflow and outflow of fluid from said chamber in order to adjust the chamber towards a predetermined pressure.

A preferred embodiment including the invention will now be described, by way of example only, with reference to the accompanying drawings, and is concerned with the pressurisation of an aircraft cabin.

Supply pressure 1 enters the system through reducing valve 2 into the supply line 4 of manifold 5. Incorporated in the manifold circuit is a standard relief valve 6, which can be preset to relieve pressure within the manifold system, if surges in supply pressure are in excess of a predetermined level. This manifold 5 supplies all main power streams to the fluid amplifier elements, and also provides the pressure necessary to operate the discharge valve 140. In the cabin 11, I have an absolute control valve 108, which consists of an absolute capsule 110 and a pad valve 107; this valve senses changes in cabin pressures transmitted through orifice 109. Main supply pressure is bled from manifold supply line 4 through restrictive orifice 99, supply line 98, to feed power nozzle 96 in amplifier element 97. The control on the power nozzle 96 is effected by a further tapping from the manifold through restrictive orifice 104 and supply line 102, and is split to flow either along line 102 to control jet 101 or along supply line 105 to the absolute control valve 108. A further bias control jet 100 is installed within amplifier element 97 acting in opposition to control jet 101, and is fed from the manifold supply line 4 through line 112; this control stream is constant, but its pressure is always lower than that passing through line 102, due to the adjustment of restrictive orifice 113; therefore, it is only operative when cabin pressure is high, when a proportion of pressure through supply line 102 is bled via line 105, pad valve 107, hence into cabin 11 through orifice 109.

Taking the case where the cabin pressure is low, the absolute capsule 110 seals the escape of supply fluid through pad valve 107 into cabin via orifice 109, therefore allowing control pressure to flow through line 102 to control jet 101. This control pressure, being greater than that flowing through control jet 100, deflects the power stream from nozzle 96 in amplifier element 97, to flow through receiving orifice 114 and on into control line 117. Incorporated into the system at this stage we have a maximum differential pressure control 121 which consists of a spring-loaded diaphragm 119 and associated pad valve 118. The chamber 120 below the diaphragm 119 vents through line 123 to true static and the chamber above the diaphragm 119 is sensitive to cabin pressure changes through orifice 120a.

The diaphragm 119 is pressed by spring 122 to close the pad valve 118, except in the event that the cabin pressure exceeds a maximum acceptable differential value between the cabin and ambient. When this occurs, the pressure from the cabin acting on the diaphragm 121 depresses the spring 122, and allows flow through line 117 to vent into the cabin through orifice 120a. During normal operation, when the differential pressure is less than the maximum acceptable value, the pad valve 118 is closed and the full effect of control flow from amplifier element 97 acts through control line 117 to control jet 124 in amplifier element 126. The power nozzle 127 in element 126 is fed via supply line 128, from a tapping and restrictive orifice 129 in the manifold supply line 4, and this is deflected to vent to cabin through receiving orifice 130.

The discharge valve 140 is operated directly from the manifold supply line 4, through restrictive orifices 136 and 144; the pressure in chamber 137 acts on a diaphragm 138, which, in compressing spring 139, operates lever 141, thus opening butterfly valve 142 in duct 143 to discharge cabin air to ambient. The control on this discharge valve 140 is effected from amplifier element 126. As previously described, when cabin pressure is low, control pressure is venting into cabin through orifice 130. There is, therefore, no controlling flow out of receiving orifice 131 into control line 132 and no pressure operating capsule 134 to seal pad valve 135. Thus, the main supply from manifold 5 and supply line 145 escapes through pad valve 135 into the cabin 11, relieving pressure in chamber 137 and on diaphragm 138 of the discharge valve 140, allowing spring 139 and associated level 141 to close butterfly valve 142 in duct 143.

The closed butterfly valve 142 prevents the discharge of cabin air to ambient and cabin pressure increases.

In general, fluid logis devices do not operate satisfactorily into an enclosed circuit or system, and accordingly the control line 132 from the final element 126 is vented through an orifice 133 into the cabin 11. In addition, part of the control line flow is diverted through a restriction 89 and a control line 84 to a feedback system which will be described later.

The part of the circuit so far described has been the main control system, but it is also essential to have a further measure of pressure control to limit the rate of change in cabin pressure, and the way in which this rate of change affects the main control pressure. This is initiated from a fluid amplifier element 10, supplied with pressure to power nozzle 9, from the manifold supply line 4 via restrictive orifice 7 and supply line 8. The control of flow from power nozzle 9 is affected by flow through an intake filter 12 and flow to and from accumulator 15, which comes into operation under the following conditions. In the case of a falling cabin air pressure due to the discharge of air through the discharge valve 140 in an open position, a signal indicating this pressure drop is transmitted through intake filter 12, to reduce the pressure at control jet 13 below the pressure at control jet 14 derived from the capacitor 15. This diverts the powerstream from power nozzle 9 to flow through receiving orifice 17 into control line 19. This control stream reaches the first stage of amplification in amplifier element 23 through control jet 21, the powerstream for this element being tapped from the manifold supply line 4 via restrictive orifice 25, and supply line 24. The power input from nozzle 22 is diverted to flow to receiving orifice 27 and on through two more stages of amplification in elements 33 and 43, where the signal causes fluid flow to divert into receiving orifice 46, and pass via control channel 49 to amplifier element 59. In a stable pressure state in the cabin 11 no signal is transmitted through the filter 12 to control jet 13, and the accumulator 15, will gradually attain cabin pressure. In this state there is no control upon power nozzle 9, and all power nozzles in amplifier elements 10, 23, 33 and 43, vent to cabin. In the case of a rising cabin pressure due to reduced discharge from the cabin 11, a pressure pulse is felt through intake filter 12 to control jet 13 in amplifier element 10, and the pressure at this jet then exceeds the pressure at jet 14 from the capacitor 15. This diverts the powerstream from nozzle 9 to pass through receiving orifice 16 into control channel 18. This signal is passed through amplifier elements 23, 33, and 43, through receiving orifice 47, into control channel 48, and on to amplifier element 54.

With a rising cabin pressure, the control signal leaving amplifier element 43 through orifice 47 is opposed by a bias flow from a rate control unit 63. This bias can be preset in the following manner. A pressure supply, tapped from the manifold line 4 through restrictive orifice 65 and supply line 64, enters into control unit 63 through orifice 68. The unit, by means of screw 66 and needle valve 67, can provide a constant flow of fluid to control jets 57 and 52 in amplifier elements 59 and 54. This bias flow opposes any signal through the system from amplifier element 43, and presents a dead band which has to be overcome before the rate signal is operative.

Therefore, in the case of a rising cabin pressure, with the discharge valve 140 limiting the quantity of air vented from the cabin 11 to ambient, when the rate of change of pressure is sufficient for the signal from control line 48 to overcome the dead band of bias pressure from jet nozzle 52 in element 54 the flow from jet 53 is diverted through receiving orifice 73 into control line 74. On reaching amplifier element 79 the pressure signal through control jet 76 diverts the main stream from power nozzle 78 into receiving orifice 91. The flow continues by way of control line 92 to control jet 95 in amplifier element 97. In this element the rate signal initiated in amplifier element 10 and issuing from jet 95 will oppose the low cabin pressure from jet 101, which is derived from the absolute control 108, which was demanding a limitation on the discharge from the valve 140 in order to raise the pressure.

In the case of a pressure reduction initiated by the absolute control 108 requiring the discharge valve 140 to open and reduce the cabin pressure, the effect of the absolute control 108 is to reduce the power at jet 101, so that the flow from jet 100 in element 97 diverts the power supply from jet 95 to discharge into receiving orifice 115. This effect will be opposed by the rate system similarly, but in a contrary function to the opposition produced by the rate system during a pressure increase. In this case, pressure reduction causes fluid to flow from the accumulator 15 to act upon the power supply in amplifier element 10 and through subsequent elements 23, 33 and 43, and if the signal is strong enough to overcome the dead band bias in amplifier element 59, to transmit the signal through control line 75 on through amplifier element 79 via receiving orifice 90 to issue from control jet 94 in opposition to the initiating signal from jet 100 in amplifier element 97.

The rate system does not operate within a band of rate of pressure change which is acceptable, due to the dead band imposed by the bias supply in amplifier elements 54 and 59. But outside this acceptable range, the rate system acts in opposition to the action of the absolute pressure control, in order to limit the rate of change of pressure within the cabin to remain within the limits of acceptability.

There is also a further control in the form of a stabilising or feedback circuit, in which a portion of the control flow from the final amplifier element 126 is diverted, as previously described, through a restrictive orifice 89, to flow through control line 84. The control line 84 is branched, one arm feeding through a restrictive orifice 85 directly to control jet 82 in amplifier 79, the other arm feeding through restrictive orifice 88, capacitor 87 and control line 86, to issue from jet 83 in opposition to the jet 82 from the direct branch. In operation, a pressure surge, either an increase or reduction causing a control signal to issue from the final element 126, passes rapidly through the direct control branch 84, to affect control jet 82 in element 79, but in the other branch 86 the effect is damped by the accumulator 87, to delay the pressure change. The power jet from nozzle 78 is diverted by control jet 82 into receiving orifice 91.

Certain modifications can be applied without departing from the scope of the invention, for example, the fluid passing through all or part of the system can be a gas or liquid, depending on the type of equipment needing pressurisation, and more than one of the discharge valves can be operated by the system. The method of control can be applied in any enclosure, whether it be an aircraft cabin, hyperbaric chamber, space craft or submarine, valve means can be operated electrically, hydraulically, or manually, and all power supplies to the system can come from a single variable source or can be independent one from another. Additional accumulators and restrictors can be added as required in the system described. Although we have shown only one type of amplifier element throughout, this need not be the case; several different forms are available, and could be used in place of the type described and shown in the preferred embodiment, an example being the vortex amplifier.

Vented amplifiers are used to simplify the design, so that all the fluid used in the logic element need not be accommodated by subsequent elements, but can be vented to space, but the amplifiers can be matched, if it is required to minimise the quantities of fluid used in the system.

I claim as my invention:

1. A fluid operated pressure control system comprising a chamber, a pressure increasing means to increase chamber pressure; a pressure decreasing means to decrease chamber pressure, sensing means including a fluid amplifier for sensing the rate of change of pressure within said nozzle and providing a signal indicative of same, said fluid amplifier including a power nozzle for receiving a flow of power fluid, a plurality of outlet apertures for said power fluid, at least one control nozzle for a flow of control fluid which interacts with said flow of power fluid from said power nozzle in response to changes in pressure in the chamber to control the direction of said flow of power fluid with respect to said apertures; means for effecting a control on said rate of change signal by opposing the rate signal developed by said fluid amplifier with a regulated bias pressure, said rate signal remaining inoperative upon said system until it attains sufficient magnitude to overcome the bias pressure and actuate at least one of said pressure increasing means and pressure decreasing means to adjust chamber pressure towards a predetermined value.

2. A fluid operated pressurization control system, as claimed in claim 1, wherein said system is applied to the compartments of an aircraft, the rate of change of pressure in said compartments being related to the rate of change of altitude of said aircraft.

3. An arrangement for controlling the rate of change of pressure in an enclosed chamber comprising: an enclosed chamber, a first fluid amplifier device having a power nozzle for receiving a flow of power fluid, a plurality of outlet apertures and at least one control nozzle for controlling the direction of flow of said power supply fluid with respect to said apertures in response to the rate of pressure change in said enclosed chamber, at least one further fluid amplifier device having a power nozzle, outlet apertures and control nozzles, said further fluid amplifier receiving fluid from said apertures of the first fluid amplifier as control fluid at the control nozzles therein to direct the power fluid of the further fluid amplifier, relative to the said apertures of the further fluid amplifier; and bias means for providing a bias pressure fluid to control nozzles in said further fluid amplifier opposing the said control fluid derived from the first fluid amplifier; thereby imposing a regulated limit upon the rate of change of pressure within said enclosed chamber.

4. A control arrangement as claimed in claim in claim 3 wherein said enclosed chamber is an aircraft cabin and said arrangement limits the rate at which the pressure in the aircraft cabin varies.

5. A method for limiting the rate of change of pressure in an enclosed chamber to a predetermined range of values comprising the steps of: supplying a power fluid to the power nozzle of a fluid amplifier having a plurality of outlet ports, supplying control fluid to two opposing control nozzles of said fluid amplifier, the flow of which control nozzles diverts the power fluid relative to the apertures, supplying an adjustable bias pressure signal to the other of said control nozzles, wherein said rate of change signal must overcome the bias signal before it can divert the power fluid relative to the apertures.

6. A method of limiting the rate of change of pressure, as claimed in claim 5, wherein said enclosed chamber is an aircraft compartment.

References Cited

UNITED STATES PATENTS

| 2,510,976 | 6/1950 | Herrala | 98—1.5 |
| 2,620,719 | 12/1952 | Price | 98—1.5 |
| 2,973,702 | 3/1961 | Andresen | 98—1.5 |
| 3,152,534 | 10/1964 | Molloy | 98—1.5 |

MEYER PERLIN, *Primary Examiner.*

U.S. Cl. X.R.

137—81.5